(12) United States Patent
Oyama et al.

(10) Patent No.: US 9,182,756 B2
(45) Date of Patent: Nov. 10, 2015

(54) DISPLAY DEVICE, DISPLAY CONTROL METHOD, PROGRAM, AND COMPUTER READABLE RECORDING MEDIUM

(75) Inventors: Satoshi Oyama, Yasu (JP); Kenichiro Mori, Tama (JP)

(73) Assignee: OMRON Corporation, Kyoto-shi (JP)

( * ) Notice: Subject to any disclaimer, the term of this patent is extended or adjusted under 35 U.S.C. 154(b) by 240 days.

(21) Appl. No.: 13/579,673

(22) PCT Filed: Jan. 27, 2011

(86) PCT No.: PCT/JP2011/051612
§ 371 (c)(1),
(2), (4) Date: Nov. 2, 2012

(87) PCT Pub. No.: WO2011/114777
PCT Pub. Date: Sep. 22, 2011

(65) Prior Publication Data
US 2013/0044115 A1 Feb. 21, 2013

(30) Foreign Application Priority Data
Mar. 15, 2010 (JP) ................................. 2010-057475

(51) Int. Cl.
*G05B 19/4068* (2006.01)
*B25J 9/16* (2006.01)

(52) U.S. Cl.
CPC ........... *G05B 19/4068* (2013.01); *B25J 9/1664* (2013.01); *G05B 2219/35349* (2013.01)

(58) Field of Classification Search
None
See application file for complete search history.

(56) References Cited

U.S. PATENT DOCUMENTS

| 5,846,086 A * | 12/1998 | Bizzi et al. ............... 434/247 |
| 6,167,328 A | 12/2000 | Takaoka et al. |
| 7,062,352 B2 | 6/2006 | Hasebe et al. |

FOREIGN PATENT DOCUMENTS

| JP | 62-083609 A | 4/1987 |
| JP | 06-138934 A | 5/1994 |

(Continued)

OTHER PUBLICATIONS

Japanese Office Action for Application No. 2010-057475 issued May 14, 2013 (1 page).

(Continued)

*Primary Examiner* — Kee M Tung
*Assistant Examiner* — Xin Sheng
(74) *Attorney, Agent, or Firm* — Nutter McClennen & Fish LLP; John J. Penny, Jr.

(57) ABSTRACT

To provide a display device capable of displaying a trajectory of a specific portion of a program controlled control target device regardless of whether the control program is a simple sequential execution type or a situation adaptive type. A PC (10), which is a display device, includes a command value acquiring section (1131) configured to acquire command values of a series of positions, which is an execution result of the control program; a position calculating section (1132) configured to obtain a series of positions of the specific portion for every control period or in a plurality of specified control periods corresponding to the acquired command values of the series of positions; a trajectory data creating section (1133) configured to create trajectory data showing a trajectory that passes each of the series of positions of the specific portion in order of elapse of time; an image data creating section (1134) configured to create image data for displaying a spatial mode of the trajectory on the screen as an image using the trajectory data; and a display control section (1011) configured to display the image on the screen using the image data.

5 Claims, 14 Drawing Sheets

(56) References Cited

FOREIGN PATENT DOCUMENTS

| JP | 11-102210 A | | 4/1999 | |
| JP | 11102210 A | * | 4/1999 | ............. G05B 19/18 |
| JP | 2003-330512 A | | 11/2003 | |
| JP | 2006-344041 A | | 12/2006 | |
| JP | 2006344041 A | * | 12/2006 | |
| JP | 2007-242054 A | | 9/2007 | |
| JP | 2008-009637 A | | 1/2008 | |
| JP | 2008009637 A | * | 1/2008 | |

OTHER PUBLICATIONS

International Search Report mailed Apr. 26, 2011 for Application No. PCT/JP2011/051612 (4 Pages).

* cited by examiner

DISPLAY DEVICE, DISPLAY CONTROL METHOD, PROGRAM, AND COMPUTER READABLE RECORDING MEDIUM

TECHNICAL FIELD

The present invention relates to a display device, a display control method, a program, and a computer readable recording medium for displaying on a screen a change in position of a specific portion of a control target device as a trajectory, in which the control target device operates when a command value of a position output by execution of a control program is input at a predefined period.

BACKGROUND ART

A control program for operating the control target device is conventionally known.

Japanese Unexamined Patent Publication No. 6-138934 (patent document 1) discloses a method using a processing program, which is the control program. Patent document 1 also describes a method of displaying an ideal tool path of a numerical value control device and displaying an actual tool path with an error between the ideal tool path and the actual tool path enlarged. With such method, the numerical value control device reads the processing program, and displays the tool path with a tool path display function incorporated in the numerical value control device.

Japanese Unexamined Patent Publication No. 2007-242054 (patent document 2) discloses a programming pendant (teaching device used by being carried around) used for the teaching of an industrial robot as the control program. The programming pendant stores an operation program in which target position data of a robot is described by a movement order. The programming pendant three-dimensionally displays graphically a trajectory of a distal end of a torch held by a robot arm that moves according to the operation program. The programming pendant may also display a surface model of the robot overlapping the trajectory.

Patent Document 1: Japanese Unexamined Patent Publication No. 6-138934

Patent Document 2: Japanese Unexamined Patent Publication No. 2007-242054

DISCLOSURE OF THE INVENTION

Problems to be Solved by the Invention

In the tool path displaying method of the numerical value control device of patent document 1, how to obtain the ideal tool path is not specifically described. However, since the tool path displaying method displays the tool path before the numerical value control device executes the processing program, it is reasonable to assume that the ideal tool path is obtained by analyzing the command and the parameter contained in the processing program in the tool path displaying method.

The programming pendant of patent document 2 displays a three-dimensional trajectory of the specific portion of the control target device. The control program executed in the programming pendant is a simple sequential execution type control program for an operation command of linearly (or arcuately) operating from a point of a certain coordinate to a point of a next coordinate. This programming pendant connects a partial trajectory having the operation command as a unit, and displays the trajectory in which such partial trajectories are connected.

Patent documents 1 and 2 disclose a technique of analyzing the command and the parameter of the simple sequential execution type control program for moving the specific portion of the control target device according to the predefined path and obtaining the path of the specific portion. Therefore, in the relevant technique, the trajectory of the specific portion of the control target device controlled by a situation adaptive type control program, in which the moving manner is changed according to arrival of a signal or change in internal state when arrival of signal from outside or change in internal state occurs during the operation, cannot be obtained.

In light of the foregoing, it is an object of the present invention to provide a display device, a display control method, a program, and a computer readable recording medium for displaying a trajectory of a specific portion of a program controlled control target device regardless of whether the control program is a simple sequential execution type or a situation adaptive type.

Means for Solving the Problem

According to one aspect of the present invention, a display device relates to a display device for displaying on a screen a change in position of a specific portion of a control target device that operates when a command value of a position output by execution of a control program is input at a predefined period. The display device includes an acquiring section configured to acquire command values of a series of positions, which is an execution result of the control program; a position calculating section configured to obtain a series of positions of the specific portion for every period or in a plurality of specified periods corresponding to the acquired command values of the series of positions; a trajectory data creating section configured to create trajectory data showing a trajectory that passes each of the series of positions of the specific portion in order of elapse of time; an image data creating section configured to create image data for displaying a spatial mode of the trajectory on the screen as an image using the trajectory data; and a display control section configured to display the image on the screen using the image data.

The trajectory data is preferably data showing a broken line in which each of the series of positions of the specific portion is connected with a line in order of elapse of time.

The trajectory data is preferably data showing a smooth curve passing each of the series of positions of the specific portion in order of elapse of time.

The trajectory data is preferably data showing a three-dimensional object formed by translating, along a line or a curve, a closed curve surrounding the line or the curve in a plane perpendicular to each line segment of a broken line in which each of the series of positions of the specific portion is connected with the line in order of the elapse of time or a plane perpendicular to a tangent line of the curve passing each of the series of positions of the specific portion in order of elapse of time.

The trajectory data is preferably data showing a three-dimensional object in a mode along the series of positions of the specific portion.

The image data creating section preferably creates data for displaying on the screen a virtual mechanism and the spatial mode of the trajectory as a moving image for the image data. The virtual mechanism may be an electronically built three-dimensional model that operates according to the command values of the series of positions. The display control section displays the moving image on the screen.

The trajectory data is preferably associated with time information. The display device further includes an accepting section configured to accept specification of a first time and a second time. The display control section displays on the screen the spatial mode of a portion of the trajectory corresponding to trajectory data between the first time and the second time using the time information.

According to another aspect of the present invention, a display control method relates to a display control method for displaying on a screen of a display device a change in position of a specific portion of a control target device that operates when a command value of a position output by execution of a control program is input at a predefined period. The display control method includes the steps of acquiring command values of a series of positions, which is an execution result of the control program, by a processor of the display device; obtaining a series of positions of the specific portion for every period or in a plurality of specified periods corresponding to the acquired command values of the series of positions by the processor; creating trajectory data showing a trajectory that passes each of the series of positions of the specific portion in order of elapse of time by the processor; creating image data for displaying a spatial mode of the trajectory on the screen as an image using the trajectory data by the processor; and displaying the image on the screen using the image data by the processor.

According to another further aspect of the present invention, a program relates to a program for displaying on a screen of a display device a change in position of a specific portion of a control target device that operates when a command value of a position output by execution of a control program is input at a predefined period. The program causes the display device to execute the steps of acquiring command values of a series of positions, which is an execution result of the control program; obtaining a series of positions of the specific portion for every period or in a plurality of specified periods corresponding to the acquired command values of the series of positions; creating trajectory data showing a trajectory that passes each of the series of positions of the specific portion in order of elapse of time; creating image data for displaying a spatial mode of the trajectory on the screen as an image using the trajectory data; and displaying the image on the screen using the image data.

According to still another further aspect of the present invention, a computer readable medium relates to a computer readable recording medium storing a program for displaying on a screen of a display device a change in position of a specific portion of a control target device that operates when a command value of a position output by execution of a control program is input at a predefined period. The program causes the display device to execute the steps of acquiring command values of a series of positions, which is an execution result of the control program; obtaining a series of positions of the specific portion for every period or in a plurality of specified periods corresponding to the acquired command values of the series of positions; creating trajectory data showing a trajectory that passes each of the series of positions of the specific portion in order of elapse of time; creating image data for displaying a spatial mode of the trajectory on the screen as an image using the trajectory data; and displaying the image on the screen using the image data.

Effect of the Invention

The trajectory of the specific portion of the program controlled control target device can be displayed regardless of whether the control program is a simple sequential execution type or a situation adaptive type.

BEST MODE FOR CARRYING OUT THE INVENTION

Figure 1:
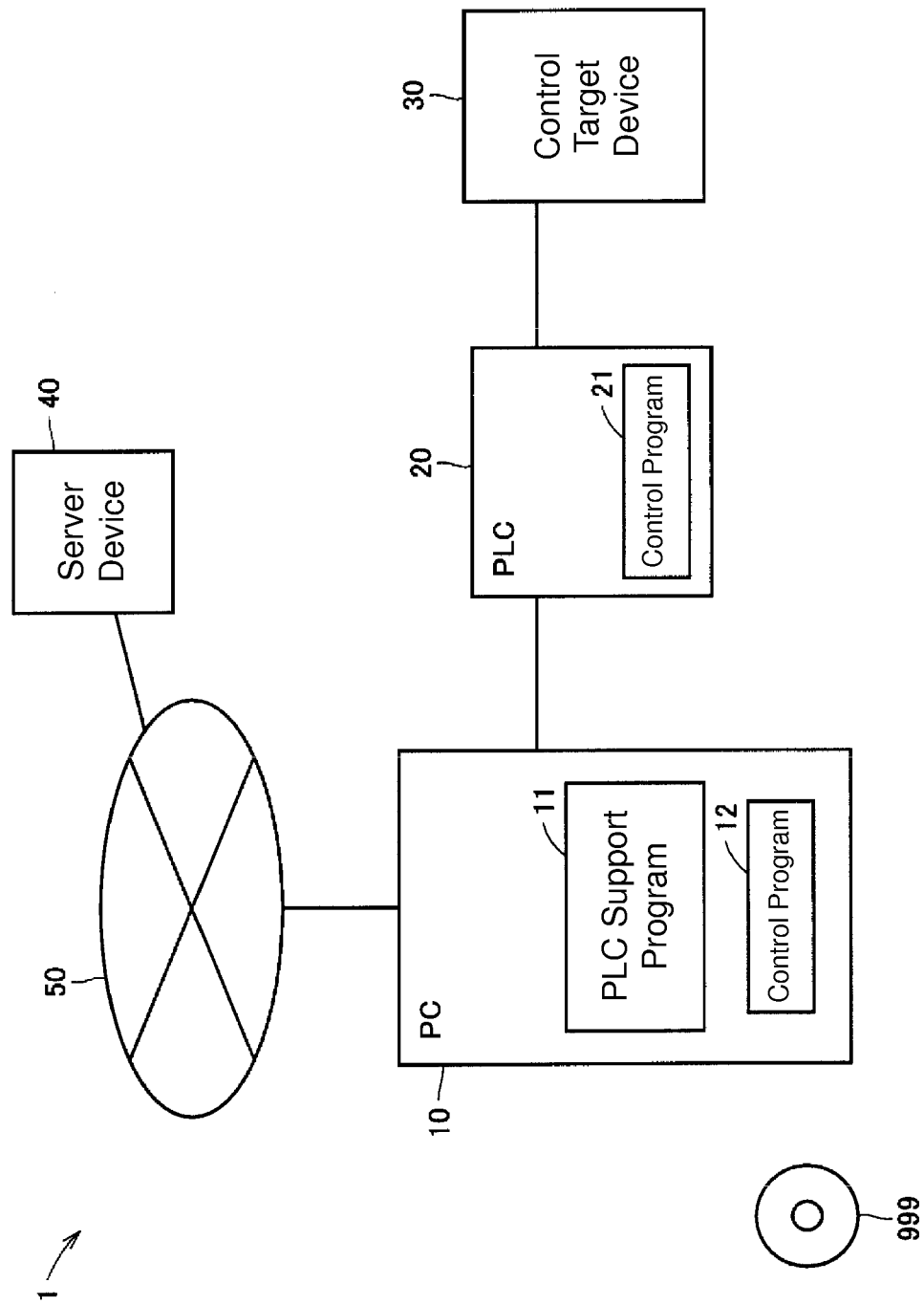
FIG. 1 is a view showing a schematic configuration of a control system.

A display device according to an embodiment of the present invention will be hereinafter described with reference to the drawings. In the following description, the same reference numerals denote the same components. The names and functions thereof do the same. Therefore, the detailed description thereon will not be repeated unnecessarily.

FIG. 1 is a view showing a schematic configuration of a control system 1 according to the present embodiment. With reference to FIG. 1, the control system 1 includes a PC (Personal Computer) 10, a PLC (Programmable Logic Controller) 20, a control target device 30, and a server device 40.

The PC (display device) 10 stores an installed PLC support program 11. The PC 10 also stores a control program 12 created by the user.

A CD-ROM 999 stores the PLC support program 11. The PLC support program 11 installed in the PC 10 is installed using the CD-ROM 999.

The PLC 20 acts as a controller for controlling the movement of the control target device 30. In other words, the PLC 20 has a so-called motion control function. The PLC 20 stores a control program 21 defining the control content with respect to the control target device 30. The PLC 20 is communicably connected to the PC 10. The control program 21 stored in the PLC 20 is sent from the PC 10. Specifically, the control program 21 is a duplicate of the control program 12 stored in the PC 10.

The control target device 30 includes a motor such as a servo motor and a stepping motor. The control target device 30 is driven by the motor. A drive current is supplied from a motor driver to the motor.

The motor driver receives a command value of a position for every control period from the PLC 20 executing the control program. The motor driver supplies the drive current corresponding to the command value of the position to the motor. If the motor is the servo motor, the motor includes an encoder. The encoder detects an actual measured value of a rotation position of the motor. The motor driver uses the actual measured value of the rotation position of the motor for feedback control.

The PC 10 is connectable to the server device 40 through a network 50 such as Internet. The PLC support program 11 can be downloaded from the server device 40 to the PC 10.

Figure 2:
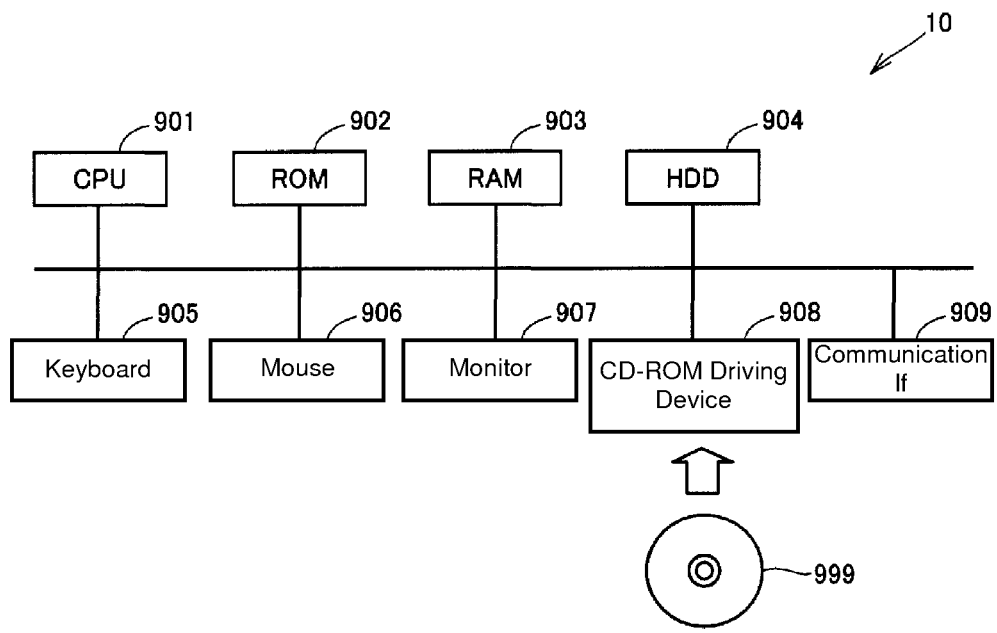
FIG. 2 is a block diagram showing a hardware configuration of a PC.

FIG. 2 is a block diagram showing a hardware configuration of the PC 10. With reference to FIG. 2, the PC 10 includes, as main configuring elements, a CPU 901 for executing the program, a ROM (Read Only Memory) 902 for storing data in a nonvolatile manner, a RAM 903 for storing in a volatile manner data created by the execution of the program by the CPU 901 or data input through a keyboard 905 or a mouse 906, a HDD (Hard Disk Drive) 904 for storing data in a nonvolatile manner, the keyboard 905 and the mouse 906 for receiving input of an instruction by the user of the PC 10, a monitor 907, a CD-ROM driving device 908, and a communication interface (IF) 909. Each configuring element is connected to each other by a data bus. The CD-ROM 999 is attached to the CD-ROM driving device 908.

The processes in the PC 10 are realized by software executed by each hardware and the CPU 901. Such software is sometimes stored in advance in the HDD 904. The software may also be stored in the CD-ROM 999 or other storage medium, and distributed as a program product. Alternatively, the software may be provided as a program product that can be downloaded by an information provider connected to the so-called Internet. Such software is read from the storage medium by the CD-ROM driving device 908 or other reading devices, or downloaded through the communication IF 909 and then once stored in the HDD 904. The software is then read out from the HDD 904 by the CPU 901 and stored in the RAM 903 in a form of an executable program. The CPU 901 executes the program.

Each configuring element configuring the PC 10 shown in the figure is a typical component. Therefore, the essential portion of the present embodiment is the software stored in the RAM 903, the HDD 904, the CD-ROM 999, or other storage medium, or the software that can be downloaded through the network. Since the operation of each hardware of the PC 10 is well known, the detailed description will not be repeated herein.

The recording medium is not limited to DVD-ROM, CD-ROM, FD (Flexible Disk), and hard disk, and may be a medium that fixedly carries the program such as a semiconductor memory including a magnetic tape, cassette tape, optical disc (MO (Magnetic Optical Disc)/MD (Mini Disc)/DVD (Digital Versatile Disc)), IC (integrated Circuit) card (include memory card), optical card, mask ROM, EPROM (Electronically Programmable Read-Only Memory), EEPROM (Electronically Erasable Programmable Read-Only Memory), flash ROM and the like. The recording medium is a non-temporary medium from which the computer can read the relevant program.

The program referred to herein includes not only the program directly executable by the CPU, but also a program in a form of source program, compression processed program, encrypted program, and the like.

Figure 3:
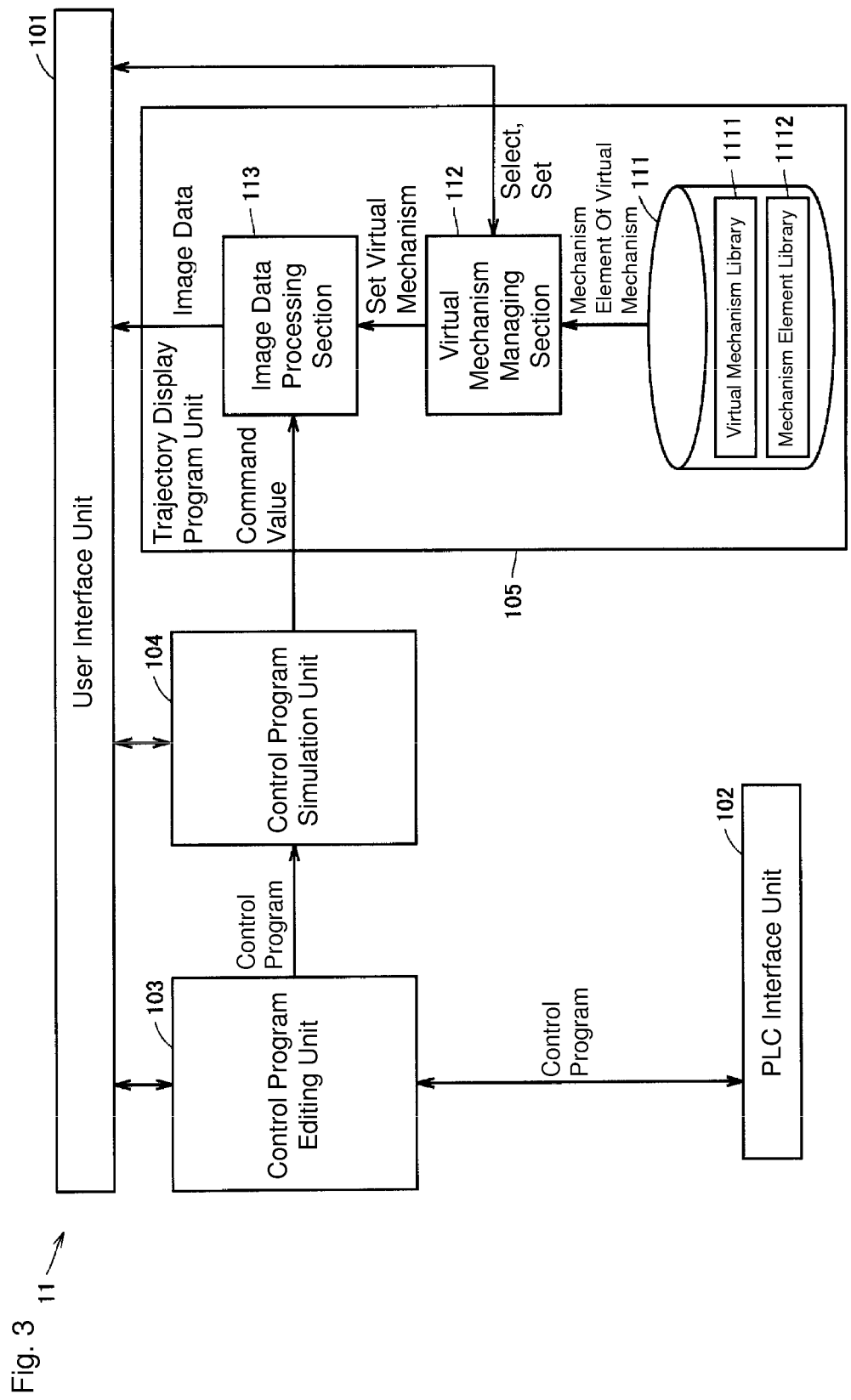
FIG. 3 is a view showing a configuration of a PLC support program.

FIG. 3 is a view showing a configuration of the PLC support program 11. With reference to FIG. 3, a user interface unit 101, a PLC interface unit 102, a control program editing unit 103, a control program simulation unit 104, and a trajectory display program unit 105 are provided. The trajectory display program unit 105 includes a library 111, a virtual mechanism managing section 112, and an image data processing section 113. The library 111 includes a virtual mechanism library 1111 and a mechanism element library 1112.

Figure 4:
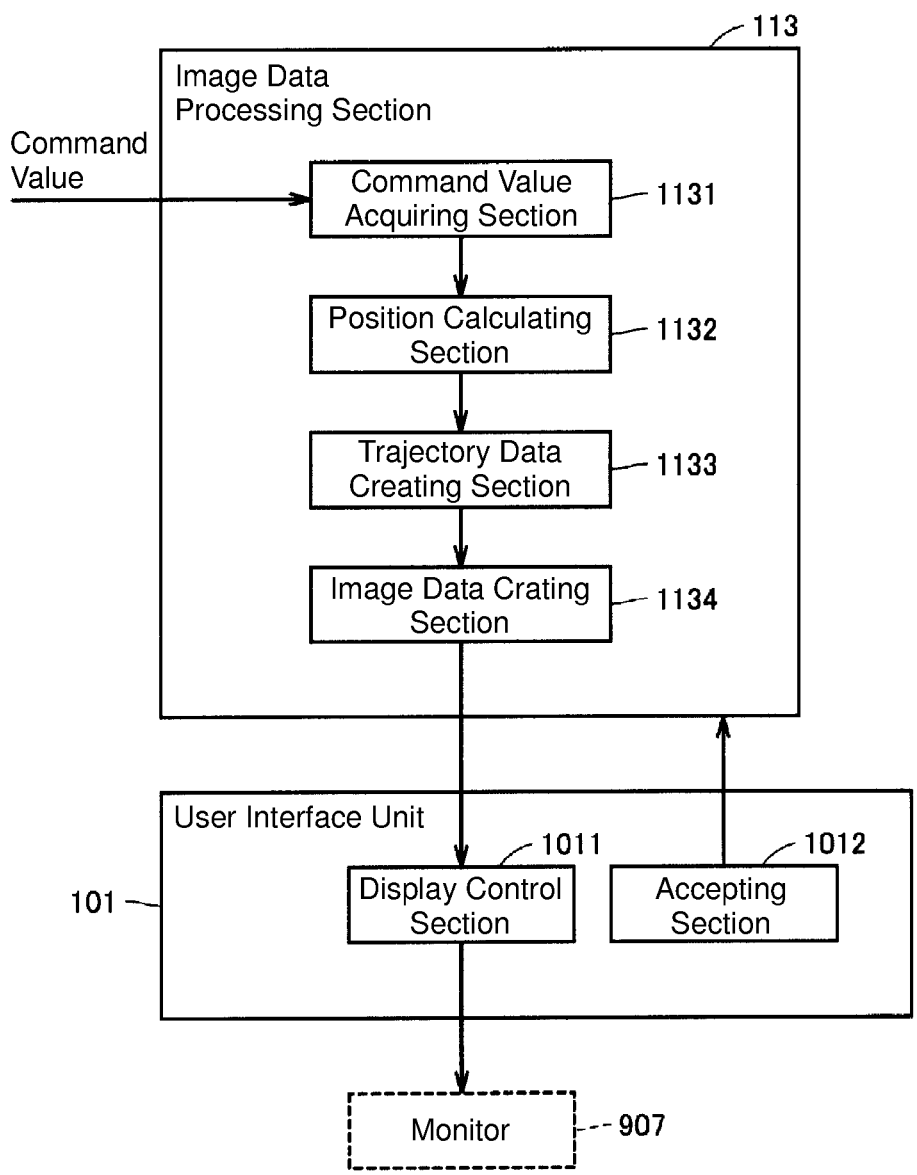
FIG. 4 is a view showing a functional configuration of an image data processing section of a trajectory display program unit and a user interface.

The user interface unit 101 creates the content of a window to be displayed on a screen of the PC 10 (screen of the monitor 907). The user interface unit 101 accepts the operation of the user made by the keyboard and the mouse. The functional configuration of the user interface unit 101 will be described later (FIG. 4).

The control program editing unit 103 performs input of the control program to the PLC 20 and edit of the control program according to an instruction accepted from the user. The control program editing unit 103 also performs compiling if compiling is necessary to execute the control program. The control program editing unit 103 transmits the created control program to the PLC 20 through the PLC interface unit 102. The control program editing unit 103 can read out the control program 21 stored in the PLC 20, and edit the read control program 21.

The control program simulation unit 104 is a simulator of the PLC 20. The control program simulation unit 104 simulates the operation in which the PLC 20 executes the control program 21, and calculates the command value of the position which the PLC 20 is to output for every control period. The control program simulation unit 104 simulates a state in which an external signal arrives and influences the operation of the control program 21. When an internal state of the PLC 20 such as the storage content of the memory of the PLC 20 is changed by the execution itself of the control program 21, the control program simulation unit 104 simulates a state in which such change influences the operation of the control program 21. The control program simulation unit 104 executes the simulation according to an instruction accepted from the user through the user interface unit 101.

The virtual mechanism managing section 112 presents a virtual mechanism, which is an electronically built three-dimensional model, prepared in the virtual mechanism library 1111 to the user as an option through the user interface unit 101. The virtual mechanism managing section 112 selects the virtual mechanism according to the instruction accepted from the user. Furthermore, if there is a content to be set by the user for the selected virtual mechanism, the virtual mechanism managing section 112 also accepts such setting through the user interface unit 101.

When the user defines a new virtual mechanism not prepared in the virtual mechanism library 1111, the virtual mechanism managing section 112 presents the mechanism element prepared in the mechanism element library 1112 to the user as an option through the user interface unit 101. The virtual mechanism managing section 112 selects the mechanism element according to the instruction accepted from the user. The virtual mechanism managing section 112 also accepts a specifying operation which specifies the connections and cooperation between mechanism elements through the user interface unit 101.

The virtual mechanism managing section 112 defines the new virtual mechanism and makes it available based on the specified content from the user, and adds the available virtual mechanism to the virtual mechanism library 1111.

FIG. 4 is a view showing a functional configuration of an image data processing section 113 arranged in the trajectory display program unit 105 and the user interface unit 101. With reference to FIG. 4, the user interface unit 101 includes a display control section 1011 and an accepting section 1012. The image data processing section 113 includes a command value acquiring section 1131, a position calculating section 1132, a trajectory data creating section 1133, and an image data creating section 1134.

The display control section 1011 displays the image data accepted from the image data creating section 1134 on the screen.

The accepting section 1012 accepts the instruction from the user. The accepting section 1012 transmits the accepted instruction to either the control program editing unit 103 or the trajectory display program unit 105 according to the content of the instruction.

The command value acquiring section 1131 acquires the command values of a series of positions, which is the execution result of the control program 12, from the control program simulation unit 104.

The position calculating section 1132 obtains a series of positions of the specific portion for every control period or in a plurality of specified control periods corresponding to the acquired command value of the position. The position calculating section 1132 may assume the acquired command value of the position as the position of the specific portion of the control target device 30. Alternatively, the position calculating section 1132 may apply a predetermined deviation to the coordinate of the acquired command value of the position to be the same as the actual position of the specific portion of the control target device 30. The "plurality of specified control periods" refers to a number of control periods extracted for every constant period.

The trajectory data creating section 1133 creates the trajectory data showing a trajectory that passes through each of the series of positions of the specific portion in order of elapse of time.

The image data creating section 1134 creates the image data for displaying a spatial mode of the trajectory on the screen as an image based on the trajectory data.

The image data processing section 113 may be configured to acquire the command values of the series of positions from the PLC 20. In this case, the command value generated when the actual equipment of the PLC 20 executes the control program 21 is acquired by the image data processing section 113 through the PLC interface unit 102. Hereinafter, a configuration in which the image data processing section 113 acquires the command values of the series of positions from the control program simulation unit 104 will be described by way of example.

The image data creating section 1134 acquires the virtual mechanism, which necessary setting is performed and which has become usable, from the virtual mechanism library 1111 through the virtual mechanism managing section 112. The image data creating section 1134 uses the command values of the series of positions acquired from the control program simulation unit 104 to create a series of image data drawing a state of the virtual mechanism in every control period or in a plurality of specified control periods. The PC 10 realizes a moving image of the virtual mechanism by sequentially displaying the series of image data on the screen through the user interface unit 101. When extracting the control period to create the image of the virtual mechanism, the control period to be extracted does not need to be the same as the control period to be extracted to obtain the trajectory.

Therefore, the image data creating section 1134 creates the image data to display on the screen the virtual mechanism and the spatial mode of the trajectory as moving images. The virtual mechanism is the electronically built three-dimensional model operating according to the command values of a series of positions. The image data creating section 1134 transmits the created image data to the user interface unit 101.

The display control section 1011 of the user interface unit 101 displays an image (moving image) based on the image data created by the image data creating section 1134 on the screen.

The PC 10 determines whether to display the trajectory without displaying the virtual mechanism on the monitor 907 or to display the trajectory and the virtual mechanism in an overlapping manner according to the selecting operation of the user. The PC 10 may select to display the virtual mechanism without displaying the trajectory.

The trajectory data created by the trajectory data creating section 1133 includes the following types of data. Which data the PC 10 uses to display the image depends on the instruction of the user.

Figure 14:
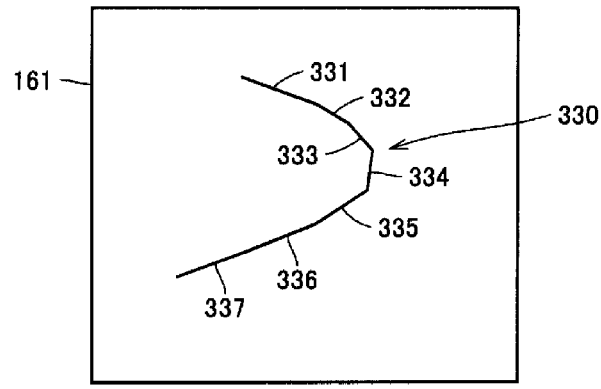
FIG. 14 is a view showing a trajectory of a broken line in which the plots of FIG. 13 are connected with a line in order of elapse of time.

(A) Data showing a broken line in which each of the series of positions of the specific portion is connected with a line in order of elapse of time (see FIG. 14).

Figure 16:
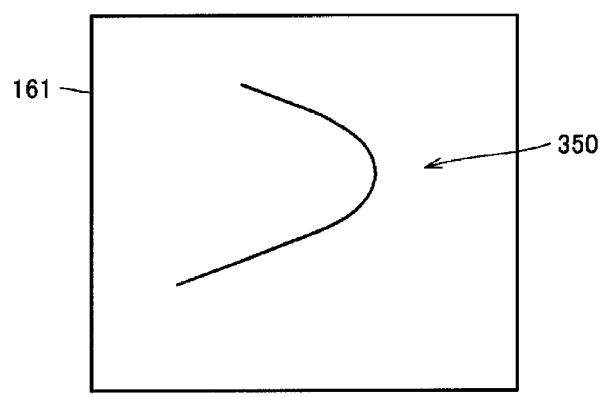
FIG. 16 is a view showing a state in which the trajectory is displayed by a smooth curve passing the plots of FIG. 13 in order of elapse of time.

(B) Data showing a smooth curve passing each of the series of positions of the specific portion in order of elapse of time (see FIG. 16 etc.). The "smooth curve" refers to a curve that can be differentiated at an arbitrary point on the curve.

Figure 15:
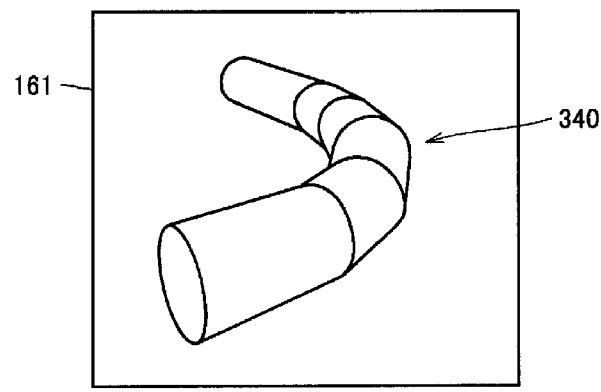
FIG. 15 is a view showing a state representing the trajectory by a three-dimensional object of a circular column array having the broken line shown in FIG. 14 as a central axis.

(C) Data showing a three-dimensional object formed by translating a closed curve surrounding a line in a plane perpendicular to each line segment in the broken line in which each of the series of positions of the specific portion is connected with the relevant line in order of elapse of time along the relevant line (see FIG. 15).

Figure 17:
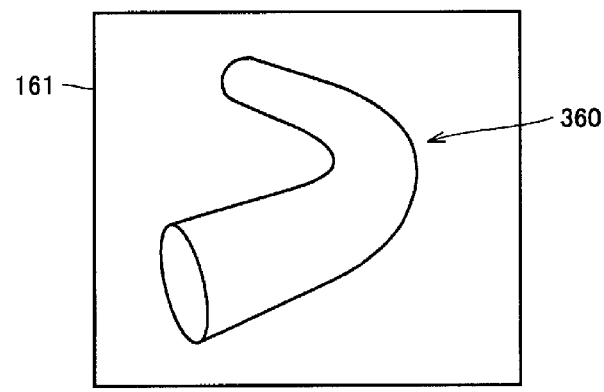
FIG. 17 is a view showing a state representing the trajectory by a wire-like three-dimensional object in which the cross-section having the curve of FIG. 16 as a central axis is a circle with a constant diameter.

(D) Data showing a three-dimensional object formed by translating a closed curve surrounding a curve in a plane perpendicular to a tangent line of the relevant smooth curve passing each of the series of positions of the specific portion in order of elapse of time along the relevant curve (see FIG. 17).

(E) Data showing a three-dimensional object in a form along positions of a series of specific positions.

More specifically, the trajectory data created by the trajectory data creating section 1133 is associated with time information. The trajectory data is, for example, associated with time information in which an execution start time of the program is 0 second. The relevant time information is generated, for example, by a timer mechanism (not shown). The time information is not limited to the information of time unit such as second, and may be a serial number of each trajectory data showing the elapsed order of time. The trajectory data and the time information may be associated in a form where the location of the memory where each trajectory data is recorded represents the time information.

The accepting section 1012 of the user interface unit 101 accepts the specification of a first time and a second time from the user. The time specification is not limited to the specification where the time can be specified by time unit such as second, and may be relative time specification such as specification by proportion of the elapsed time of the entire execution time of the program. When the accepting section 1012 accepts the first time and the second time, the display control section 1011 displays a spatial mode of a portion of the trajectory corresponding to the trajectory data between the first time and the second time on the screen.

When the accepting section 1012 accepts only the first time, the display control section 1011 displays a spatial mode of a portion of the trajectory corresponding to the trajectory data after the first time on the screen based on the time information.

Figure 5:
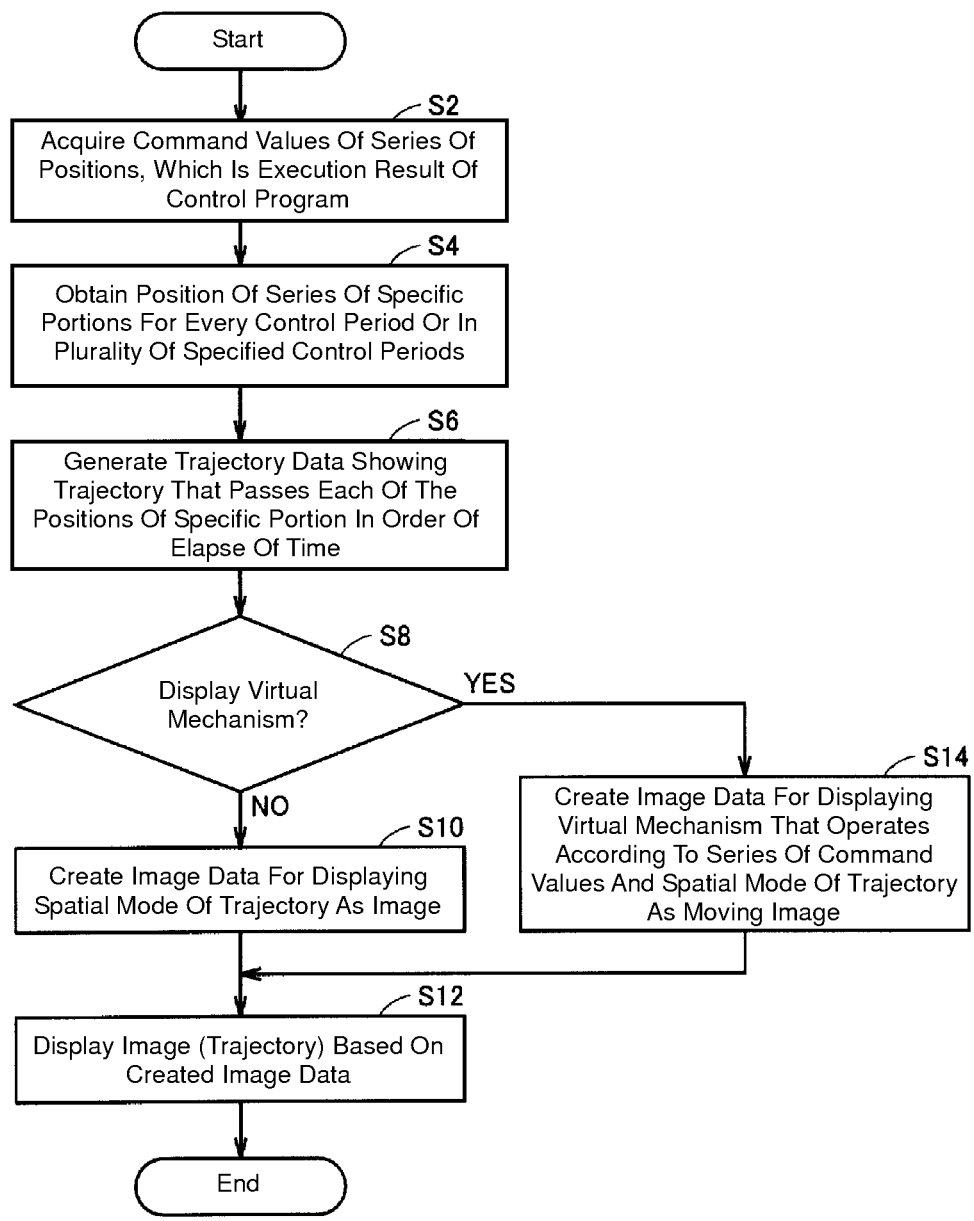
FIG. 5 is a flowchart showing a process of the trajectory display in the PC.

FIG. 5 is a flowchart showing a process of the trajectory display in the PC 10. With reference to FIG. 5, in step S2, the command value acquiring section 1311 acquires the command values of a series of positions, which is the execution result of the control program, from the control program simulation unit 104. In step S4, the position calculating section 1132 obtains the position of the series of specific portions for every control period or in a plurality of specified control periods corresponding to the acquired command value of the position.

In step S6, the trajectory data creating section 1133 creates the trajectory data showing the trajectory that passes each of the series of positions of the specific portion in order of elapse of time. In step S8, the image data processing section 113 determines whether or not an instruction to display the virtual mechanism is accepted through the user interface unit 101.

When accepting the instruction to display the virtual mechanism (YES in step S8), the image data creating section 1134 creates image data for displaying the virtual mechanism that operates according to the command value of a series of positions and a spatial mode of the trajectory on the screen as a moving image. When not accepting the instruction to display the virtual mechanism (NO in step S8), the image data creating section 1134 creates image data for displaying the spatial mode of the trajectory on the screen.

In step S12, the display control section 1011 displays the image data received from the image data creating section 1134 on the screen. In other words, the PC 10 displays the image of the trajectory based on the image data created by the image data creating section 1134 on the screen.

Figure 6:
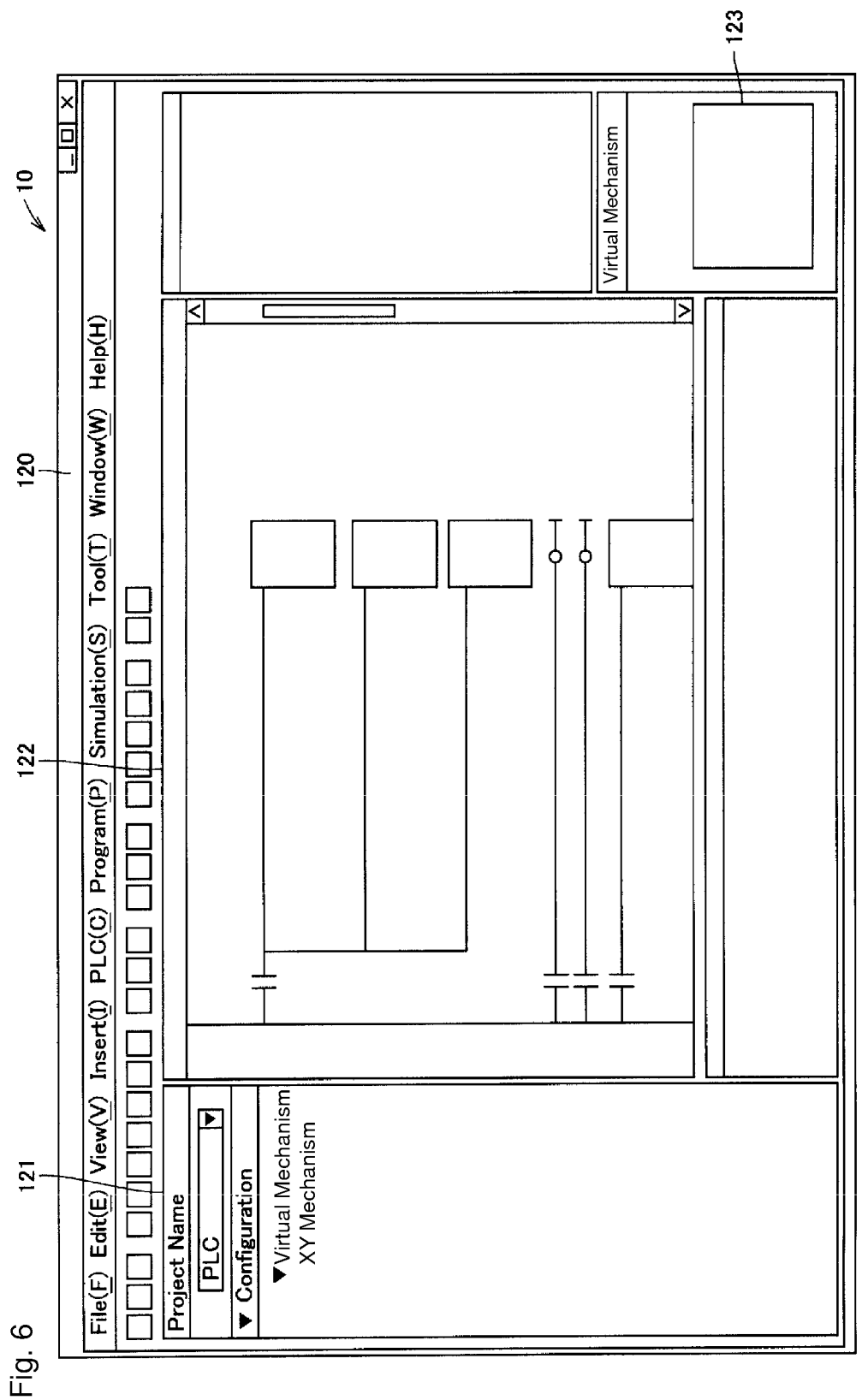
FIG. 6 is a view showing a window displayed on the PC when the PLC support program is executed.

FIG. 6 is a view showing a window 120 displayed on the PC 10 when the PLC support program 11 is executed. With reference to FIG. 6, the window 120 includes a setting region 121, a control program editing region 122, and an image display link region 123.

The setting region 121 is a region for performing input of various settings required in carrying out the editing and the simulation of the control program 12. When the user selects (e.g., clicks) characters "virtual mechanism" in the setting region 121, the PC 10 opens a virtual mechanism selection screen (see FIG. 7) as another window. Characters "XY mechanism" indicate that the currently selected virtual mechanism is the XY mechanism.

The control program editing region 122 is used to enable the user to input the control program or to edit the control program.

When the user selects the image display link region 123, the PC 10 opens an image display screen (FIG. 9) as another window.

Figure 7:
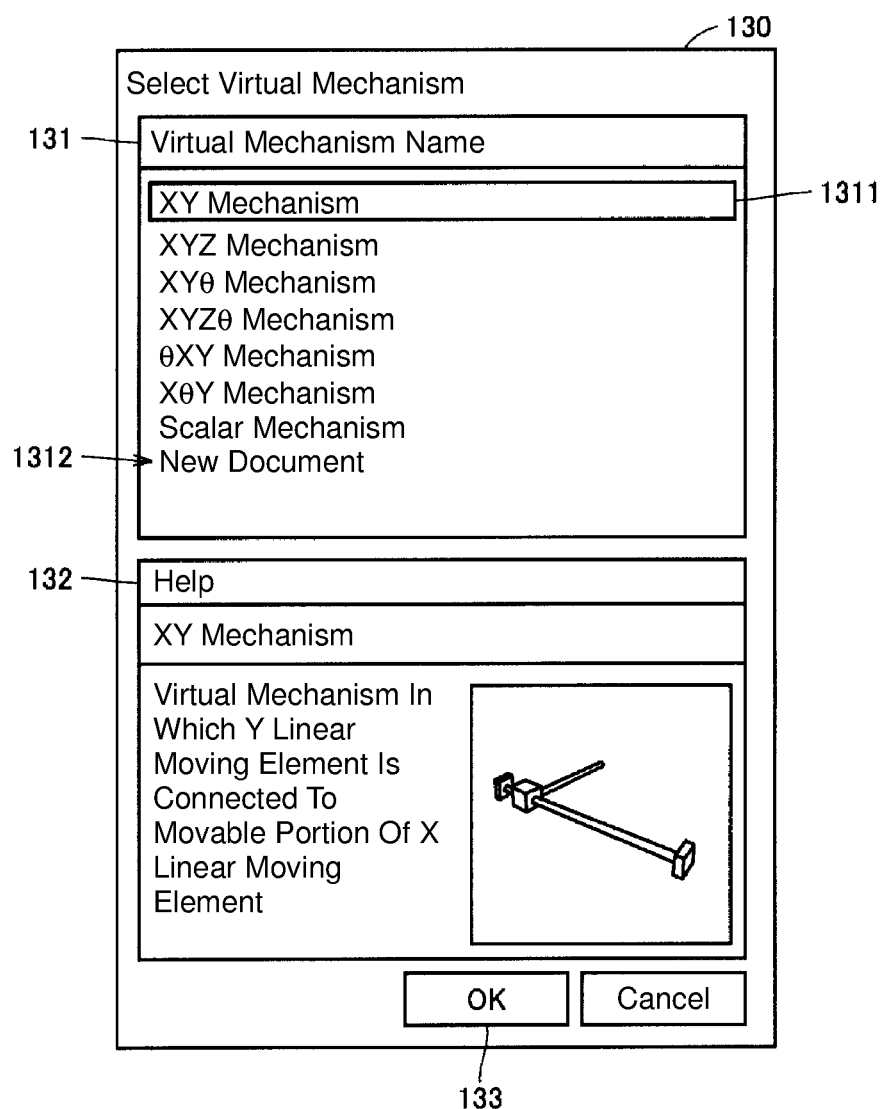
FIG. 7 is a view showing a window for selecting a virtual mechanism.

FIG. 7 is a view showing a window 130 for selecting the virtual mechanism. FIG. 7 also shows the image output to the screen of the PC 10 by the execution of the PLC support program 11. With reference to FIG. 7, the window 130 includes a region 131 showing a virtual mechanism name, a region 132 showing help, and a region 133 showing OK button.

The PC 10 displays a list of available virtual mechanism in the region 131 showing the virtual mechanism name. When one of the virtual mechanism names is clicked by the user, the PC 10 causes the clicked virtual mechanism to be in a selected state. FIG. 7 shows a state in which the XY mechanism 1311 surrounded by a square is selected. If the user pushes the OK button in this state, the selection of the XY mechanism is confirmed. If the selected virtual mechanism requires the input of the setting information, the PC 10 opens a virtual mechanism setting screen as another window, and urges the user to input the setting information.

The PC 10 displays a description on the selected virtual mechanism in the region showing help.

When the region 1312 of "new document" of the region 131 showing the virtual mechanism name is selected and such selection is confirmed, the PC 10 opens a new virtual mechanism creating screen as another window. The user then can define a new virtual mechanism.

Figure 8:
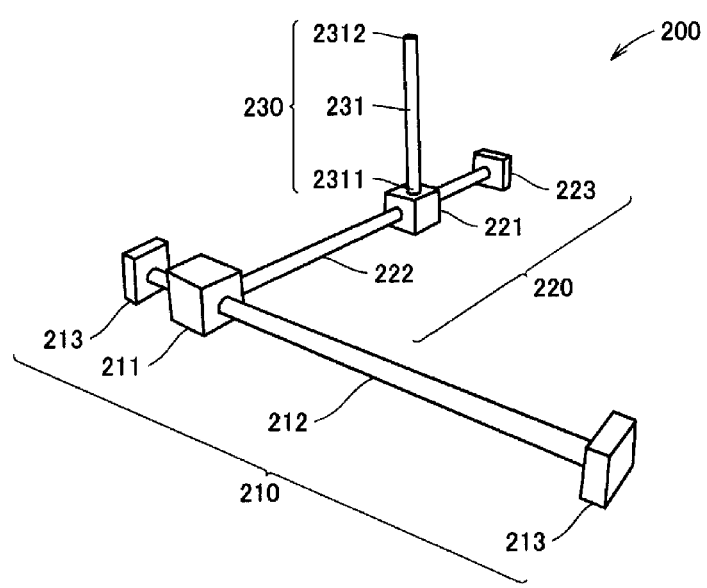
FIG. 8 is a view showing an XYZ mechanism, which serves as an example of the virtual mechanism.

FIG. 8 is a view showing an XYZ mechanism, which serves as an example of the virtual mechanism. With reference to FIG. 8, an XYZ mechanism 200 includes a first element 210, a second element 220, and a third element 230. The first element 210, the second element 220, and the third element 230 are respectively a linear moving element in the X direction, a linear moving element in the Y direction, and a linear moving element in the Z direction.

The first element 210 includes a movable portion 211, a linear moving shaft 212, and two terminating members 213. The second element 220 includes a movable portion 221, a linear moving shaft 222, and a terminating member 223. The third element 230 includes a linear moving shaft 231, which is an extensible column.

The shape of each linear moving shaft 212, 222, 231 is a circular column. The shape of each movable portion 211, 221 is a cube. The movable portion 211 is moved along the linear moving shaft 212. The shape of the terminating members 213, 223 is a vertical plate shape. The terminating member 213 is arranged at each end of the linear moving shaft 212. The terminating member 223 is arranged at an end on an opposite side of the movable portion 211 on the linear moving shaft 222.

The second element 220 is connected to the movable portion 211 of the first element 210 so as to operate in cooperation with the movement of the movable portion 211. The third element is connected to the movable portion 221 of the second element 220 so as to operate in cooperation with the movement of the movable portion 221.

Thus, the linear moving elements in the X direction and the Y direction (first element 210, second element 220) are displayed in a mode to include the linear moving shaft 212, 222 and the movable portion 211, 221 that moves along the linear moving shaft. The linear moving element in the Z direction (third element 230) is displayed in a mode of an extensible column having a basal end 2311 connected to the movable portion 221 of the linear moving element in the Y direction.

The position of a distal end 2312 of the linear moving shaft 231 (extensible column) in the Z direction shows the XYZ coordinate of the command value of the provided position.

Since the virtual mechanism is not set with a deviation between the command value of the position and the position of the specific portion to obtain the trajectory, the distal end position of the extensible column in the Z direction becomes the position of the specific portion to obtain the trajectory.

Figure 9:
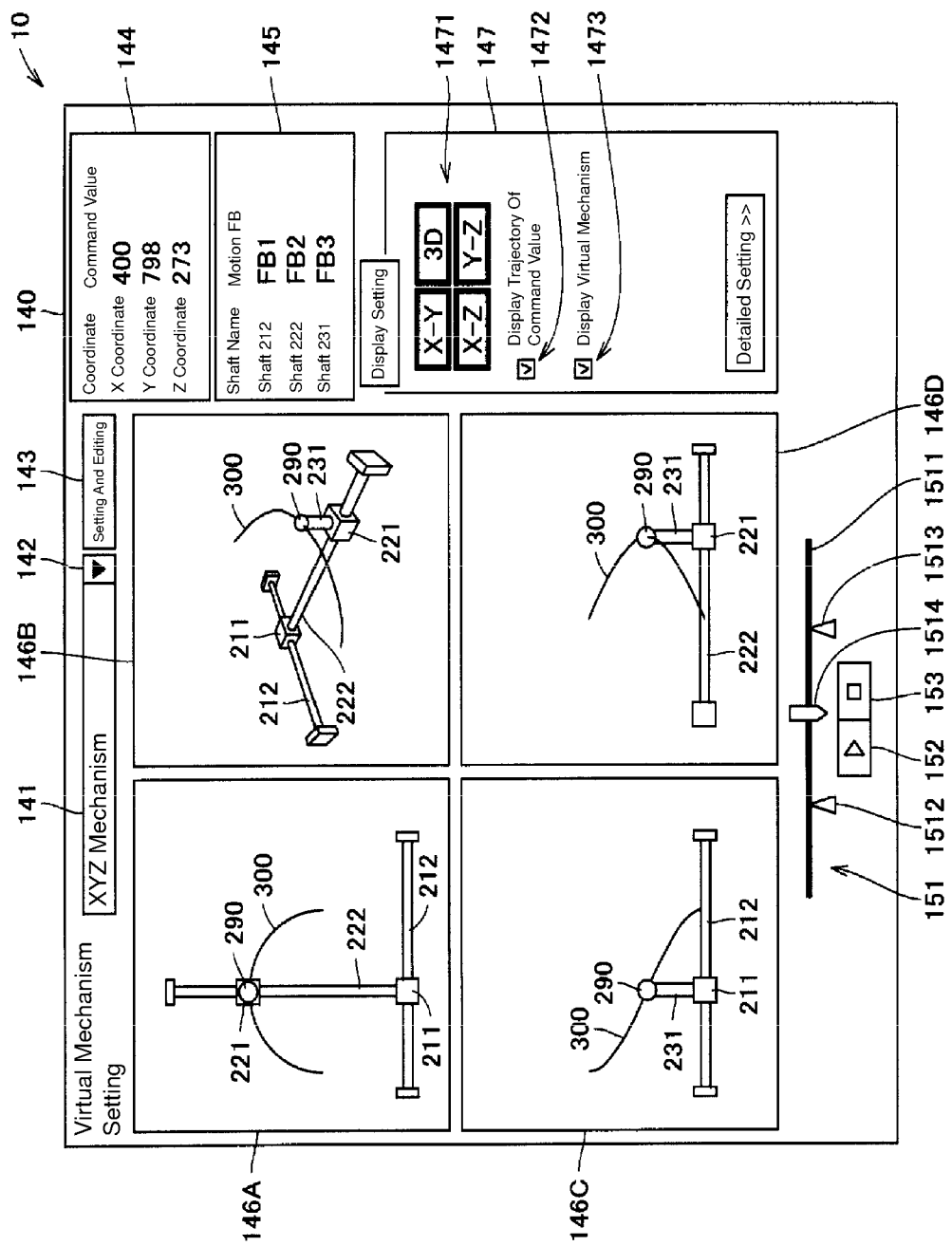
FIG. 9 is a view showing a screen in which the virtual mechanism and the trajectory of the specific portion are displayed.

FIG. 9 is a view showing a screen 140 in which the virtual mechanism and the trajectory of the specific portion are displayed. Specifically, FIG. 9 is a view showing the screen 140 (hereinafter also referred to as "window 140") opened when the image display link region 123 of FIG. 6 is clicked. FIG. 9 shows an image output to the screen of the PC 10 by the execution of the PLC support program 11.

The window 140 includes a region 141 showing a name of the virtual mechanism currently being used, a triangular mark 142, a button 143 showing setting and editing, a region 144 showing a coordinate value, a region 145 showing correspondence of the axis and the motion FB (Function Block), target image display regions 146A, 146B, 146C, 146D, a display setting region 147, a play slide bar 151, a play button 152, and a stop button 153. The play slide bar 151 includes a play time bar 1511, a trajectory starting point tab 1512, a trajectory ending point tab 1513, and a current time tab 1514.

The PC 10 displays the region 141 showing a name of the virtual mechanism currently being used, the triangular mark 142, and the button 143 showing setting and editing at the upper part of the window 140. The PC 10 displays the play slide bar 151, the play button 152, and the stop button 153 at the lower part of the window 140.

The PC 10 displays a list of virtual mechanisms when the user selects the triangular mark 142. The PC 10 changes the virtual mechanism currently being used to the selected virtual mechanism when the user selects an item contained in the displayed list. When the button 143 for setting and editing is pushed by the user, the PC 10 opens a virtual mechanism setting screen as another window. The PC 10 displays the current value of the command value for every coordinate axis in the region 144 showing the coordinate value.

The PC 10 displays a correspondence relationship of an axis name and the motion FB name used in the control program 12 in the region 145 showing the correspondence of the axis and the motion FB. The motion FB is a program element used in the control program 12. Specifically, the motion FB is a motion program subjected to be moduled for every basic unit of the operation such as a movement from one point to another point. The motion FB calculates the command value for every control period. The PC 10 displays the currently operating motion FB in the region 145 showing the correspondence of the axis and the motion FB.

The PC 10 displays a projection diagram of the XYZ mechanism 200 and the trajectory 300 with respect to the XY plane formed by two orthogonal coordinate axes X, Y in the target image display region 146A. The PC 10 displays a 3D image of the XYZ mechanism 200 and the trajectory 300 in the target image display region 146B. The PC 10 displays a projection diagram of the XYZ mechanism 200 and the trajectory 300 with respect to the XZ plane formed by two orthogonal coordinate axes X, Z in the target image display region 146C. The PC 10 displays a projection diagram of the XYZ mechanism 200 and the trajectory 300 with respect to the YZ plane formed by two orthogonal coordinate axes Y, Z in the target image display region 146D.

The PC 10 displays each button 1471 indicating a corresponding display method ("3D", "X-Y", "X-Z", "Y-Z") in the display setting region 147 so as to be in an arrangement corresponding to the respective position relationship of the target image display regions 146A, 146B, 146C, 146D. The PC 10 changes the arrangement of each target image display region 146A to 146D when accepting an instruction to change the arrangement of the four buttons 1471 from the user. When accepting the instruction in which the user selects one of the buttons 1471 from the user, the PC 10 displays in an enlarged manner the target image display region corresponding to the selected button.

The 3D display is drawn by a perspective view method. The PC 10 changes the position of view point and the viewing direction in the three-dimensional space according to the mouse operation of the user.

The PC 10 can change the display magnification of the display content in each target image display region 146A to 146D. The PC 10 can also scroll move the display content up and down, and left and right.

The PC 10 displays the trajectory 300 (trajectory of command value of the position in the embodiment) of the specific portion of the control target device 30 and the XYZ mechanism 200, which is the virtual mechanism, in an overlapping manner in each target image display region 146A to 146D. In FIG. 9, the trajectory 300 is shown with a curve. The PC 10 displays a current position marker 290 indicating the current position at the distal end 2312 of the linear moving element in the Z direction (third element 230). In FIG. 9, the current position marker 290 is shown with a small sphere. The trajectory 300 displayed by the PC 10 is a trajectory that draws a semicircle in the projection to the XY coordinate plane while rising in the Z direction.

In addition to the arrangement of each target image display region 146A to 146D described above, the PC 10 displays a checkbox 1472 for enabling the user to select whether or not to display the trajectory 300 of the command value, and a checkbox 1473 for enabling the user to select whether or not to display the XYZ mechanism 200 in the display setting region 147. The PC 10 displays only the trajectory 300 when not displaying the XYZ mechanism 200. The PC 10 may display only the trajectory 300 and the current position marker 290 when not displaying the XYZ mechanism 200. When the user pushes a detailed setting button, the PC 10 displays an operation screen to perform setting of the thickness of the trajectory, setting of the display color of the trajectory, setting of displaying the coordinate axis and the coordinate numerical value, and the like.

The play time bar 1511 represents a time required to execute the control program 12 from the beginning to the end. The PC 10 moves the current time tab 1514 from the left to the right on the play time bar 1511 with elapse of the execution time of the control program 12. The PC 10 changes the display start time of the moving image when the user drag operates the current time tab 1514 with the mouse.

The trajectory starting point tab 1512 and the trajectory ending point tab 1513 respectively indicate the display start time of the trajectory and the display end time of the trajectory. When the user drag operates each tab 1512, 1513 with the mouse, the PC 10 moves the tabs 1512, 1513 along the play time bar 1511. If the current position (position of current position marker 290) is continuously moved with elapse of time, when the user inputs a command to move the trajectory starting point tab 1512 or the trajectory ending point tab 1514, the PC 10 changes the length of the trajectory 300 being displayed according to the command.

The trajectory starting point tab 1512 and the trajectory ending point tab 1513 may be moved in a step-wise manner to a time period corresponding to the transition in program execution such as the control period in which the execution of the motion FB is started. In this case, the user can observe the trajectory corresponding to a specific time zone related to the state transition during the program execution. The PC 10 may be configured to automatically adjust the display magnification of the image display unit to display at a size where the trajectory corresponding to the entire execution time of the control program 12 or the displayed trajectory can be easily observed.

When the user pushes the play button 152, the PC 10 starts the display of the moving image. When the user pushes the stop button 153, the PC 10 stops the display of the moving image.

When starting the display of the moving image, the PC 10 displays a state in which each mechanism element is moved and the current position marker 290 is moved along the trajectory. The PC 10 draws the XYZ mechanism 200 of the same time in each target image display region 146A to 146D, and synchronizes the movement of the XYZ mechanism 200 displayed in each target image display region 146A to 146D.

Each sequentially displayed still image configuring the moving image draws the trajectory and the XYZ mechanism in the control period extracted at a constant interval. By way of example, the moving image is assumed to be configured by a series of still images displayed 60 frames per second, that is, at 16.7 ms interval, where the control period is 167 µs. In this case, the PC 10 can display the virtual mechanism that moves at the same speed as the actual control target device 30 by creating and sequentially displaying the still image corresponding to the control period every 100 control periods. The control period to create the still image is not necessarily limited to a constant interval. In particular, if the desired speed in the display cannot be achieved with one control period for every integer time, the PC 10 may fine tune the interval of the control period to create the still image each time to achieve the desired speed in the display on average.

If the PC 10 is configured to accept the user operation to change the interval of the control period to create the still image, the user can freely make the operation speed of the control target device 30 on display faster or slower. If the PC 10 is configured to sequentially display the still images in all the control periods, the user can observe the movement of the virtual mechanism in detail at slow motion.

Figure 10:
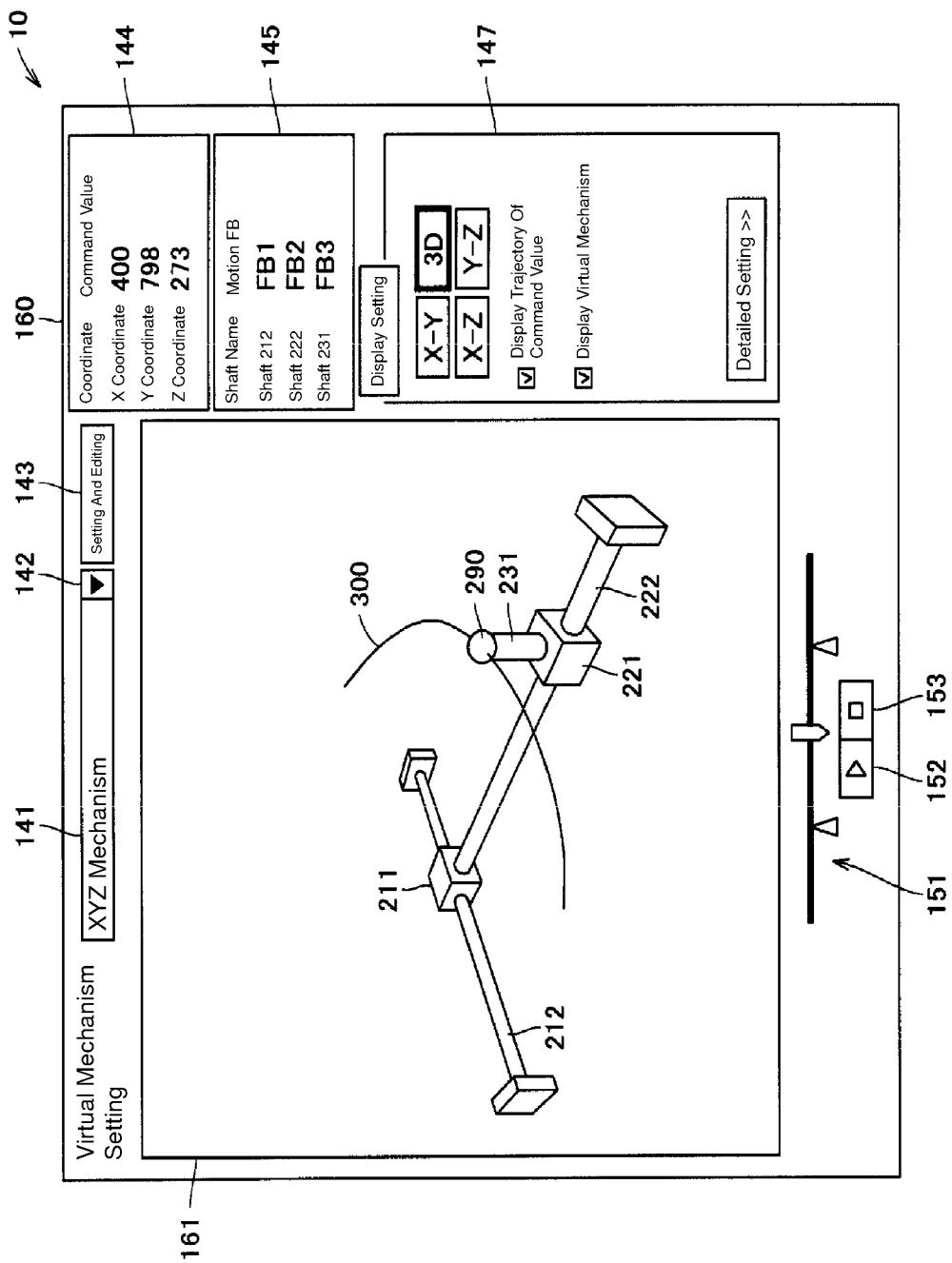
FIG. 10 is a view showing another screen in which the virtual mechanism and the trajectory of the specific portion are displayed.

FIG. 10 is a view showing a screen 160 in which the virtual mechanism and the trajectory of the specific portion are displayed. Specifically, FIG. 10 is a view showing a screen displayed when the user pushes the button 1471 indicating "3D" of the display setting region 147 of FIG. 9. With reference to FIG. 10, when the user pushes the button 1471 indicating "3D", the PC 10 enlarges the 3D display. That is, the PC 10 displays in an enlarged manner the XYZ mechanism 200 and the trajectory 300 shown in the target image display region 146B of FIG. 9 in the target image display region 161. When the user again pushes the button 1471 indicating "3D" in the state shown in FIG. 10, the PC 10 returns from the screen 160 to the screen 140 (FIG. 9).

Figure 11:
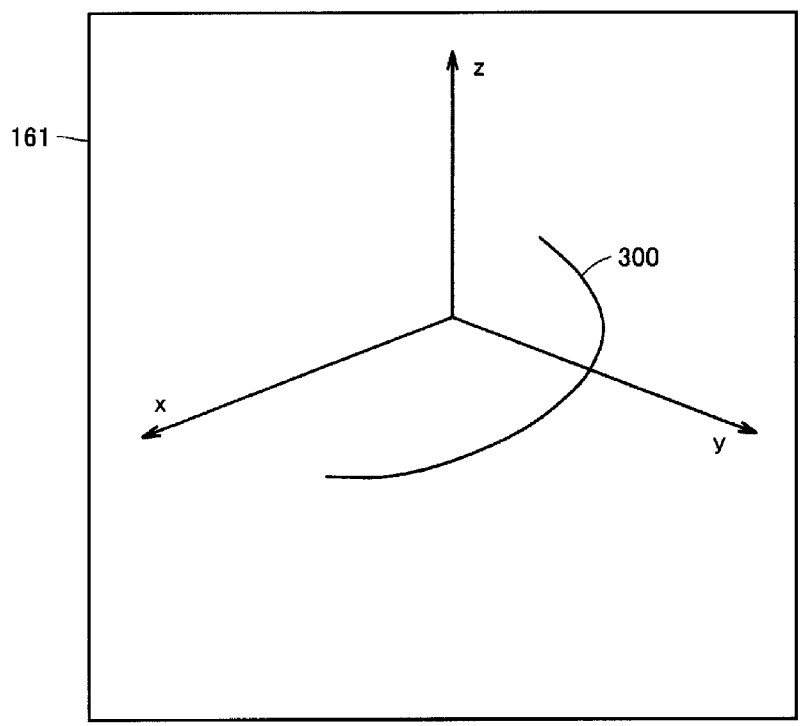
FIG. 11 is a view showing a display content of the target image display region when the display of the virtual mechanism is eliminated while leaving the display of the trajectory and the display of the coordinate axes is added.

FIG. 11 is a view showing a display content of the target image display region 161 when the display of the XYZ mechanism 200 is eliminated while leaving the display of the trajectory 300 and the display of the coordinate axes is added. More specifically, FIG. 11 is a view showing a case where the thickness of the image (three-dimensional object) displayed in the target image display region 161 is set to zero.

In such setting, the PC 10 displays the trajectory 300 as a curve of a constant thickness. The PC 10 does not change the thickness of the trajectory 300 in the display even when accepting the operation of moving the view point closer to or away from the curve.

An example of displaying the object in the target image display region 161 has been described above, but it is similar when displaying the object in the target image display regions 146A to 146D. Furthermore, it is similar for FIG. 12 to FIG. 17, to be described later.

The display method of the trajectory by the PC 10 is not limited to FIG. 11. Other display methods of the trajectory will be described below. Which display method the PC 10 performs is based on the instruction of the user.

Figure 12:
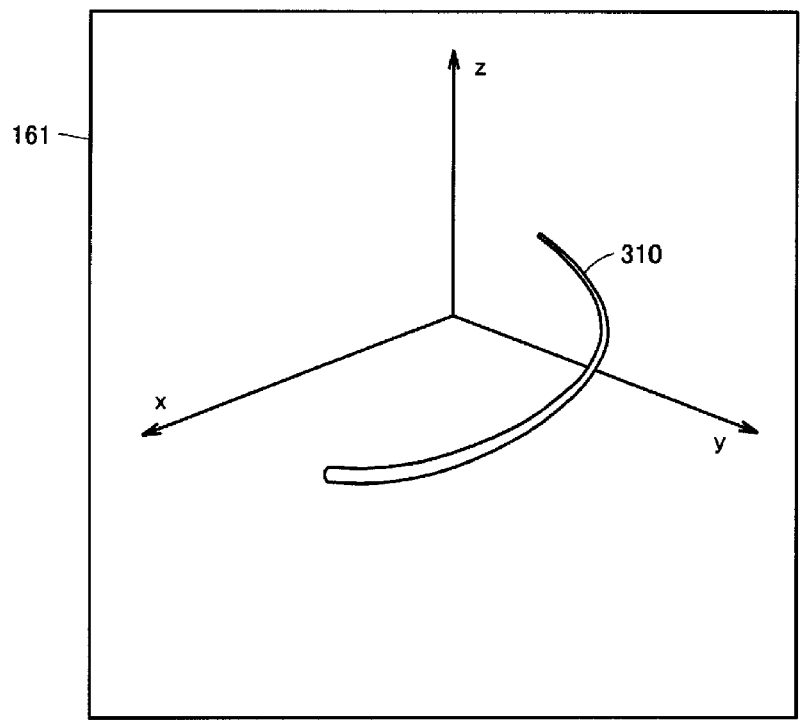
FIG. 12 is a view showing a trajectory when a thickness (diameter of circular cross-section) representing a three-dimensional object is provided to the trajectory of FIG. 11.

FIG. 12 is a view showing a trajectory 310 when a thickness (diameter of circular cross-section) representing a three-dimensional object is provided to the trajectory 300 of FIG. 11. With reference to FIG. 12, the PC 10 displays the trajectory 310 such that the portion closer to the view point is thick and the portion distant from the view point is thin, whereby the user can easily three-dimensionally grasp the shape of the trajectory 310.

The function enabling the user to make a specification to display the trajectory as a line in which the thickness on the screen is constant while giving a non-zero thickness to the three-dimensional object of the trajectory may be provided to the PC 10. The PC may be configured as below.

With respect to the portion where the thickness on the screen of the trajectory drawn in a mode of a three-dimensional object having thickness is greater than or equal to a specific thickness that is easy to visibly recognize, the PC 10 draws such portion as is in the mode of the three-dimensional object. With respect to the portion where the thickness on the screen does not satisfy a specific thickness and is difficult to visibly recognize if the trajectory is drawn as is as the three-dimensional object since it is distant from the view point, the PC 10 automatically replaces such portion with a line of a constant thickness that is easy to visibly recognize and displays the trajectory. With such configuration, the user can reliably visibly recognize the trajectory three-dimensionally.

Figure 13:
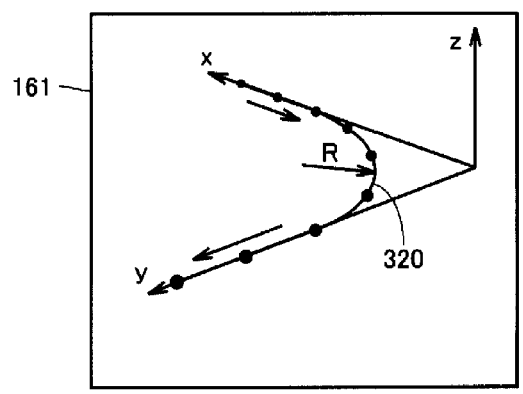
FIG. 13 is a view showing a state in which the coordinate of the command value of the position is plotted in the three-dimensional space to describe the manner of drawing the trajectory.

FIG. 13 is a view showing a state in which the coordinate of the command value of the position is plotted in the three-dimensional space to describe the manner of drawing the trajectory. With reference to FIG. 13, the coordinate of the command value is first moved towards the origin on the x-axis. The coordinate of the command value is transitioned on the y-axis drawing a circular arc of a radius R near the origin. Thereafter, the coordinate of the command value is advanced on the y-axis in the direction of moving away from the origin.

In reality, the coordinate of the command value appears discrete like above when the interval of the control period extracted to draw the trajectory 320 is very large or the view point is brought very close to the trajectory.

FIG. 14 is a view showing a trajectory 330 of a broken line in which the plots of FIG. 13 are connected with a line in order of elapse of time. Specifically, FIG. 14 is a view showing a case where the trajectory data is data showing the broken line in which each of the series of positions of the specific portion is connected with a line in order of elapse of time.

With reference to FIG. 14, the thickness serving as the three-dimensional object of the trajectory 330 is zero. The trajectory 330 is configured by a plurality of line segments 331 to 337. When performing such display, the calculation time for generating the image of the trajectory 330 is not significant in the PC 10. Thus, the PC 10 can rapidly display the trajectory 330 with a reduced calculation time. The user sees the broken line as a smooth curve by slightly moving the view point from the current position in the direction opposite to the screen.

FIG. 15 is a view showing a state representing the trajectory by a three-dimensional object of a circular column array having the broken line shown in FIG. 14 as a center axis. Specifically, FIG. 15 is a view showing a case where the trajectory data is data showing the three-dimensional object formed by translating, along a line, a closed curve surrounding the line in a plane perpendicular to each line segment in the broken line in which each of the series of positions of the specific portion is connected with the line in order of elapse of time.

With reference to FIG. 15, a trajectory 340 is displayed in a three-dimensional shape. Thus, the user can easily three-dimensionally grasp the shape of the trajectory compared to when the trajectory is displayed with the broken line. The PC 10 also has a function of displaying by shading the side surface of the circular column. The user can more easily three-dimensionally grasp the trajectory by shading.

FIG. 16 is a view showing a state in which the trajectory is displayed by a smooth curve passing the plots of FIG. 13 in order of elapse of time. Specifically, FIG. 16 is a view showing a case where the trajectory data is data showing a smooth curve passing each of the series of positions of the specific portion in order of elapse of time.

With reference to FIG. 16, the thickness representing the three-dimensional object of the trajectory 350 is zero. When the PC 10 performs such display, the user can see the smooth trajectory curve even if the user brings the view point close to the portion where the movement is rapidly changing or the PC 10 displays the relevant portion in an enlarged manner according to the instruction of the user. The calculation time for generating the image of the trajectory 350 is also relatively small.

FIG. 17 is a view showing a state representing the trajectory by a wire-like three-dimensional object in which the cross-section having the curve of FIG. 16 as a center axis is a circle with a constant diameter. Specifically, FIG. 17 is a view showing a case where the trajectory data is data showing a three-dimensional object formed by translating, along a curve, a closed curve surrounding the curve in a plane perpendicular to a tangent line of the smooth curve passing each of the series of positions of the specific portion in order of elapse of time.

With reference to FIG. 17, the user can easily three-dimensionally grasp the shape of the trajectory compared to when the trajectory is displayed with a curve. Furthermore, as described above, the user can more easily three-dimensionally grasp the trajectory if the PC 10 displays with the surface of the three-dimensional object shaded.

In the cases of FIG. 15 to FIG. 17, a case where the cross-section (cross-section perpendicular to the extending direction of the trajectory) of the three-dimensional object of the trajectory is a circle is shown. However, the cross-section of the three-dimensional object of the trajectory is not limited to a circle, and may be an arbitrary closed curve. The cross-section does not strictly need to be a symmetric figure having the broken line of FIG. 14 or the curve of FIG. 16 as an axis. The three-dimensional object representing the trajectory merely needs to be in a mode that lies along a row of positions of the display target portion of the trajectory as long as the user can recognize that the trajectory is being shown when displayed on the screen. In other words, the trajectory data merely needs to be data showing the three-dimensional object of a mode taken along the series of positions of the specific portion.

Some of the configurations, functions, and the like of the PC 10 described above can be summarized as below.

(1) The PC 10 includes the command value acquiring section 1131 for acquiring command values of a series of positions, which is the execution result of the control program. The PC also includes the position calculating section 1132 for obtaining the series of positions of the specific portion for every period or in a plurality of specified periods corresponding to the acquired command values of the series of positions. The PC 10 also includes the trajectory data creating section 1133 for creating trajectory data showing the trajectory that passes each of the series of positions of the specific portion in order of elapse of time. The PC 10 also includes the image data creating section 1134 for creating image data for displaying on the screen a spatial mode of the trajectory as an image using the trajectory data. Furthermore, the PC 10 includes the display control section 1011 for displaying the image on the screen using the image data.

Therefore, according to the PC 10, the trajectory of the specific portion of the program controlled control target device 30 can be displayed regardless of whether the control program is a simple sequential execution type or a situation adaptive type.

(2) The trajectory data creating section 1133 creates data showing a broken line in which each of the series of positions of the specific portion is connected with a line in order of elapse of time as the trajectory data.

Therefore, the PC 10 can obtain the trajectory with a simple calculation. Furthermore, when the true trajectory is a curve, the PC 10 can display the trajectory so as to appear as a smooth curve to the user if the interval between the positions of each specific portion is sufficiently short.

(3) The trajectory data creating section 1133 creates data showing a smooth curve passing each of the series of positions of the specific portion in order of elapse of time as the trajectory data.

Therefore, even if the interval of each position of the specific portion is large or the PC 10 displays in an enlarged manner one part of the trajectory according to the instruction of the user, the PC 10 can display the trajectory that appears as a smooth curve.

(4) The trajectory data creating section 1133 creates data showing a three-dimensional object formed by translating, along a line, a closed curve surrounding the line in a plane perpendicular to each line segment of a broken line in which each of the series of positions of the specific portion is connected with the line in order of the elapse of time as the trajectory data.

Therefore, the PC 10 displays the trajectory as a three-dimensional object similar to a wire or a cable having a surface and a thickness. The user thus can correctly position the trajectory in the three-dimensional space and easily grasp the same when looking at the image of the displayed trajectory.

(5) The trajectory data creating section 1133 creates the data showing a three-dimensional object formed by translating, along a curve, a closed curve surrounding the curve in a plane perpendicular to a tangent line of the smooth curve passing each of the series of positions of the specific portion in order of elapse of time as the trajectory data.

Therefore, the PC 10 displays the trajectory as a three-dimensional object similar to a wire or a cable having a surface and a thickness. The user thus can correctly position the trajectory in the three-dimensional space and easily grasp the same when looking at the image of the displayed trajectory.

(6) The trajectory data creating section 1133 creates the data showing the three-dimensional object in a mode along the series of positions of the specific portion as the trajectory data.

Therefore, the PC 10 displays the trajectory as a three-dimensional object similar to a wire or a cable having a surface and a thickness. The user thus can correctly position the trajectory in the three-dimensional space and easily grasp the same when looking at the image of the displayed trajectory.

(7) The image data creating section 1134 creates data for displaying on the screen a virtual mechanism, which is an electronically built three-dimensional model that operates according to the command values of the series of positions, and the spatial mode of the trajectory as a moving image for the image data. The display control section 1011 displays the moving image on the screen.

Therefore, the user can easily understand the movement of the control target device 30 by having the PC 10 display the trajectory with the moving virtual mechanism.

(8) The trajectory data is associated with time information. The PC 10 further includes an accepting section 1012 for accepting the specification of a first time and a second time. The display control section 1011 displays on the screen the spatial mode of a portion corresponding to trajectory data between the first time and the second time in the trajectory using the time information.

Therefore, the PC 10 specifies the range of displaying the mode of trajectory with time. Thus, the PC 10 can display the mode of the trajectory in an arbitrary range without being limited to the transitional point by the movement order of the control program, and start or end of the execution of the program element of the motion function block, and the like.

The embodiments disclosed herein are illustrative and should not be limited only by the contents described above. The scope of the invention is defined by the Claims, where meanings equivalent to the Claims and all modifications within the scope of the Claims are intended to be encompassed therein.

| DESCRIPTION OF SYMBOLS |
|---|
| 1 control system    11 PLC support program    12 control program    21 control program    30 control target device    40 server device    50 network    101 user interface unit    102 PLC interface unit    103 control program editing unit    104 control program simulation unit    105 trajectory display program unit    111 library    112 virtual mechanism managing section    113 image data processing section    121 setting region    122 control program editing region    123 image display link region    146A, 146B, 146C, 146D target image display region    147 display setting region    151 play slide bar    152 play button    153 stop button    161 target image display region    200 XYZ mechanism    210 first element    220 second element    230 third element    290 current position marker    300, 310, 320, 330, 340, 350, 360 trajectory    331, 332, 333, 334, 335, 336, 337 line segment    907 monitor    1011 display control section    1012 accepting section    1111 virtual mechanism library    1112 mechanism element library    1131 command value acquiring section    1132 position calculating section    1133 trajectory data creating section    1134 image data creating section    1511 play time bar    2312 distal end |

The invention claimed is:

1. A display device for displaying on a screen a change in position of a specific portion of a control target device that operates when a command value of a position output by execution of a control program is input at a predefined period, the display device comprising a computer configured to form the following components:

an acquiring section for acquiring command values of a series of positions, which is an execution result of the control program;

a position calculating section for obtaining a series of positions of the specific portion for every period or in a plurality of specified periods corresponding to the acquired command values of the series of positions;

a trajectory data creating section for creating trajectory data showing a trajectory that passes each of the series of positions of the specific portion in order of elapse of time;

an image data creating section for creating image data for displaying a spatial mode of the trajectory on the screen as an image using the trajectory data; and a display control section for displaying the image on the screen using the image data, wherein the trajectory data is data showing a three-dimensional object formed by translating, along a line or a curve, a closed curve surrounding the line or the curve in a plane perpendicular to each line segment of a broken line in which each of the positions of the series of specific portions is connected with the line in order of the elapse of time or a plane perpendicular to a tangent line of a smooth curve passing each of the series of positions of the specific portion in order of elapse of time.

2. The display device according to claim 1, wherein the image data creating section creates image data for displaying on the screen a virtual mechanism and the spatial mode of the trajectory as a moving image, the virtual mechanism being an electronically built three-dimensional model that operates according to the command values of the series of positions; and the display control section displays the moving image on the screen.

3. The display device according to claim 1, wherein the trajectory data is associated with time information; and the display device further includes an accepting section, formed by the computer, for accepting specification of a first time and a second time; and the display control section displays on the screen the spatial mode of a portion of the trajectory corresponding to trajectory data between the first time and the second time using the time information.

4. A display control method for displaying on a screen of a display device a change in position of a specific portion of a control target device that operates when a command value of a position output by execution of a control program is input at a predefined period, the method comprising the steps of:
- acquiring command values of a series of positions, which is an execution result of the control program, by a processor of the display device;
- obtaining a series of positions of the specific portion for every period or in a plurality of specified periods corresponding to the acquired command values of the series of positions by the processor;
- creating trajectory data showing a trajectory that passes each of the series of positions of the specific portion in order of elapse of time by the processor;
- creating image data for displaying a spatial mode of the trajectory on the screen as an image using the trajectory data by the processor; and
- displaying the image on the screen using the image data by the processor,
- wherein the trajectory data is data showing a three-dimensional object formed by translating, along a line or a curve, a closed curve surrounding the line or the curve in a plane perpendicular to each line segment of a broken line in which each of the positions of the series of specific portions is connected with the line in order of the elapse of time or a plane perpendicular to a tangent line of a smooth curve passing each of the series of positions of the specific portion in order of elapse of time.

5. A non-transitory computer readable recording medium storing a program for displaying on a screen of a display device a change in position of a specific portion in a control target device that operates when a command value of a position output by execution of a control program is input at a predefined period, the program causing the display device to execute the steps of:
- acquiring command values of a series of positions, which is an execution result of the control program;
- obtaining series of positions of the specific portion for every period or in a plurality of specified periods corresponding to the acquired command values of the series of positions;
- creating trajectory data showing a trajectory that passes each of the series of positions of the specific portion in order of elapse of time;
- creating image data for displaying a spatial mode of the trajectory on the screen as an image using the trajectory data; and
- displaying the image on the screen using the image data,
- wherein the trajectory data is data showing a three-dimensional object formed by translating, along a line or a curve, a closed curve surrounding the line or the curve in a plane perpendicular to each line segment of a broken line in which each of the positions of the series of specific portions is connected with the line in order of the elapse of time or a plane perpendicular to a tangent line of a smooth curve passing each of the series of positions of the specific portion in order of elapse of time.

* * * * *